United States Patent

Kolomeitsev et al.

[11] Patent Number: 5,844,346
[45] Date of Patent: Dec. 1, 1998

[54] LOW TORQUE RIPPLE SWITCHED RELUCTANCE MOTOR

[75] Inventors: Sergei F. Kolomeitsev, Sylvania, Ohio; K. Fred Brodsky, Rockton, Ill.

[73] Assignee: Dana Corporation, Toledo, Ohio

[21] Appl. No.: 634,537

[22] Filed: Apr. 18, 1996

[51] Int. Cl.⁶ .............. H02K 1/06; H02K 19/06; H02K 19/20
[52] U.S. Cl. .......... 310/254; 310/166; 310/168; 310/269; 310/49 R
[58] Field of Search .............. 310/254, 269, 310/166, 168, 49 R

[56] References Cited

U.S. PATENT DOCUMENTS

| | | | |
|---|---|---|---|
| 519,097 | 5/1894 | Schmid | 310/254 |
| 710,425 | 10/1902 | Churchward | 310/254 |
| 4,000,452 | 12/1976 | Heine | 318/696 |
| 4,327,302 | 4/1982 | Hershberger | 310/156 |
| 4,647,802 | 3/1987 | Konecny | 310/49 R |
| 4,873,462 | 10/1989 | Harned | 310/49 R |
| 4,947,066 | 8/1990 | Ghibu et al. | 310/49 R |
| 4,949,000 | 8/1990 | Petersen | 310/179 |

FOREIGN PATENT DOCUMENTS

| | | |
|---|---|---|
| 0170741 | 8/1984 | European Pat. Off. . |
| 1277876 | 8/1968 | United Kingdom . |
| 2260860 | 4/1993 | United Kingdom . |

*Primary Examiner*—Nestor Ramirez
*Assistant Examiner*—Karl Imayoshi Tamai
*Attorney, Agent, or Firm*—Dykema Gossett PLLC

[57] ABSTRACT

A switched reluctance motor includes a stator defining a plurality of radially-inwardly-extending poles and a rotor defining a plurality of radially-outwardly-extending poles. The poles of the stator define a shape in radial cross-section characterized by a generally rectangular body portion, and a tip portion which tapers at an angle no greater than 40° relative to the sides of the rectangular body portion. The nominal width of the rectangular body portion of each stator pole is at least 1.3 times the nominal (chordal) dimension across the arcuate, radially-innermost surface on the tip portion thereof.

11 Claims, 2 Drawing Sheets

LOW TORQUE RIPPLE SWITCHED RELUCTANCE MOTOR

FIELD OF THE INVENTION

The present invention relates to electric machines having a stator and a rotor, wherein the shape of the poles in radial cross-section are altered so as to improve the machine's performance when operated as a switched reluctance motor, i.e., when its respective machine phases are consecutively and sequentially energized to provide substantially continuous rotation of the rotor within the stator.

BACKGROUND OF THE INVENTION

The prior art teaches electric machines, such as switched reluctance motors, which operate on the basis of varying reluctance in their several magnetic circuits. Typically, such machines are doubly salient, that is, each machine has poles on both its stator and its rotor. The stator poles are typically encompassed by electric windings to form the phases of the machine and, in a common configuration, the stator windings on diametrically opposite poles are connected in series to form one machine phase. The rotor's poles are likewise disposed about the rotor's periphery in diametrical pairs.

When a machine phase is energized, the resulting magnetic field tends to urge the nearest rotor pole pair toward an aligned position with the poles of the energized phase, thereby applying a torque to the rotor whose profile is itself dependent upon several factors, including the shapes of the stator and rotor poles and their relative rotational positions, and the manner in which the machine phase is itself energized, e.g., the current applied to the stator windings. By energizing consecutive machine phases in succession, and in a cyclical fashion, the rotor may be urged to rotate continuously by virtue of the resulting overlapping torque profiles generated by the individual machine phases.

Unfortunately, the nominal torque profile for each machine phase is such that the overlapping torque profiles themselves combine to produce a varying overall torque output for the motor, also known as torque "ripple". In response, the prior art teaches varying the amplitude of the electric current applied to each stator winding as a function of the relative angular position of the rotor (sometimes referred to as "current mapping"), thereby generating machine phase torque profiles which, when combined, provide a nearly constant machine torque output. This prior art approach, however, requires additional electronic circuitry with which to sense the relative angular position of the rotor and to modulate the applied current in response thereto. Such additional circuitry greatly increases the cost and complexity of the resulting machine.

Thus, there is a need to provide an electrical machine that reduces or eliminates one or more problems as described above.

SUMMARY OF THE INVENTION

In accordance with the present invention, an improved switched reluctance motor comprises an annular stator defining a plurality of radially-inwardly-extending poles, and a rotor supported for rotation within the stator and defining a plurality of radially-outwardly-extending poles. In accordance with the invention, each stator pole defines a shape in radial cross-section characterized by a generally rectangular body portion having parallel sides which extend from the inner periphery of the stator, preferably in a direction generally parallel to a radial line bisecting the respective pole; and a tapered tip portion, wherein the angle at which the sides of the tip portion taper is no greater than about 40°, but most preferably at least about 30°, relative to the sides of the rectangular body portion; and wherein the nominal width of each pole's rectangular body portion is at least 1.3 times, but most preferably between about 1.3 times and about 1.45 times, the nominal (chordal) dimension across the tip portion's radially-innermost surface (the latter surface being slightly concave so as to define a nearly constant air gap between opposed stator and rotor pole tips during operation of the motor).

The resulting switched reluctance motor features a "flattened" torque profile for each energized machine phase. As a result, upon energizing consecutive machine phases in succession, a relatively constant output torque is obtained from a motor which is otherwise simple and inexpensive, both in construction and operation.

BRIEF DESCRIPTION OF THE DRAWINGS

Referring to the drawings, wherein like reference numerals are used to designate like elements in each of the several figures.

DETAILED DESCRIPTION OF THE PREFERRED EMBODIMENT(S)

Figure 1:
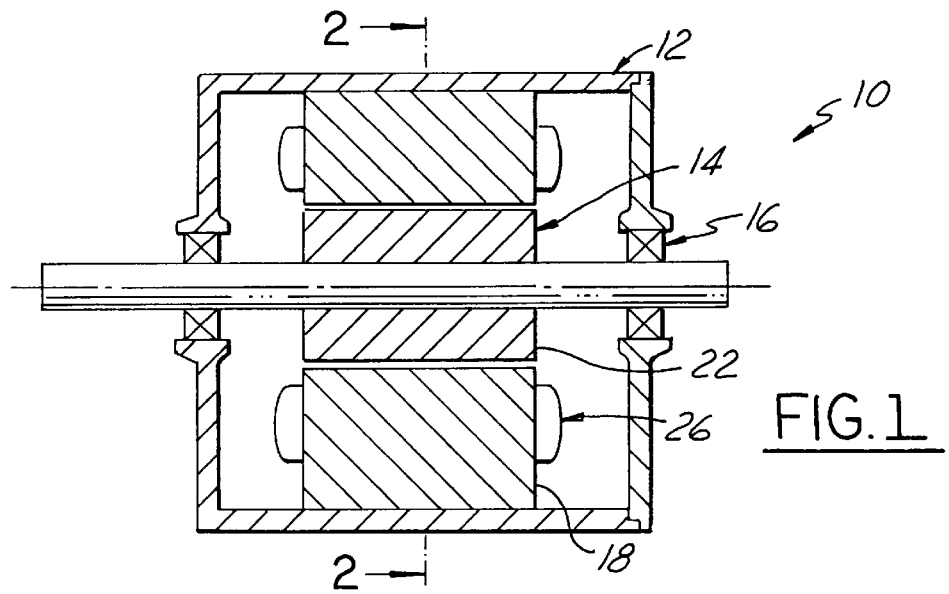
FIG. 1 is a schematic longitudinal view in cross-section of a four-phase switched reluctance motor in accordance with the present invention.

A four-phase switched reluctance motor 10 in accordance with the present invention is shown schematically in FIG. 1 as including a generally annular stator 12, and a rotor 14 which is concentrically supported for rotation within the stator 12 as by bearings 16 secured proximate to the respective longitudinal ends of the stator 12. The stator 12 is formed as a laminated stack (not shown) of a magnetically-permeable material such as iron.

Figure 2:
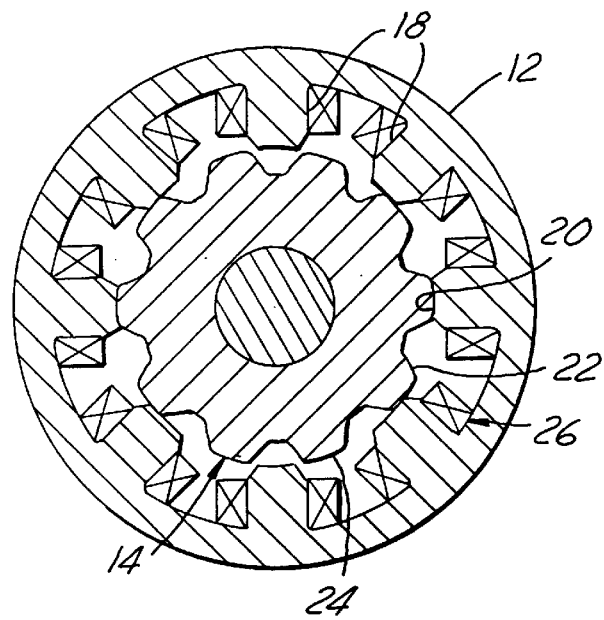
FIG. 2 is a view in cross-section of the motor along line 2—2 of FIG. 1.

As seen more clearly in FIG. 2, a plurality of radially-inwardly-extending poles 18 are formed on the stator 12, deployed about the stator's inner periphery in diametrically-opposed pairs. It will be appreciated that, while the stator 12 of the illustrated embodiment is provided with eight poles 18, a greater or lesser number of poles 18 may be provided in any particular machine configuration. The radially-innermost surface 20 of each stator pole 18 is preferably slightly concave so as to define a nominal "bore" within which to receive the rotor 14.

The rotor 14 itself includes a plurality of radially-outwardly-extending poles 22 are formed on the rotor assembly 14, also in diametrical pairs. As noted with respect to the stator 12, the rotor 14 may be provided with a greater or lesser number of poles 22 than the ten such poles 22 of the illustrated embodiment, noting further that, for switched reluctance motors, it is well known to provide a different number of poles 22 on the rotor 14 as is provided on the stator 12. The radially-outermost surfaces 24 of each rotor pole 22 is preferably slightly convex to define an effective outer rotor diameter adapted to be received within, i.e., slightly smaller than the stator assembly's "bore."

An electrical conductor is wound about each of the stator poles 18 with the resulting stator windings 26 of diametrically opposite stator poles 18 being connected in series to form one machine phase. Each machine phase may be energized individually and, when consecutive machine phases are energized in sequence, provides for rotation of rotor 14 within the stator 12.

Figure 3:
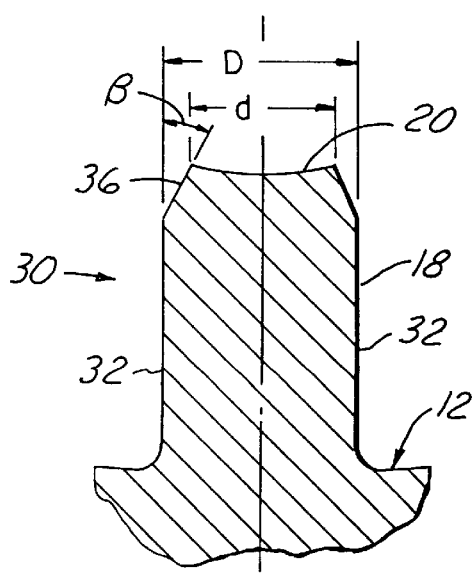
FIG. 3 is an enlarged partial sectional view of one of the motor's stator poles.

As seen in FIGS. 2 and 3, in accordance with the present invention, each of the stator's poles 18 defines a shape in radial cross-section characterized by a generally rectangular body portion 30 having parallel sides 32 which extend from the inner periphery of the stator 12, preferably in a direction generally parallel to a radial line 34 bisecting each respective stator pole 18. The rectangular body portion 30 conveniently serves as a rectangular coil form about which to wind the conductor forming the stator winding 26 or, alternatively, about which to receive a mating wound bobbin (not shown). The rectangular body portion 30 may further ensure that the shape of each stator pole 18 does not otherwise consume useful winding space proximate to its base.

In accordance with the present invention, the shape of each stator pole 18 is further characterized by a tapered tip portion 36, wherein the angle β at which the sides of the tip portion 36 taper is no greater than about 40°, but most preferably at least about 30°, relative to the sides 32 of the rectangular body portion 30. Still further, the nominal width D of each pole's rectangular body portion 30 is at least 1.3 times, but most preferably between about 1.3 times and about 1.45 times, the nominal (chordal) dimension d across the tip portion's radially-innermost surface 20 (the latter surface 24 cooperating with the slightly convex opposing rotor surface 24 so as to define a nearly constant air gap between opposed stator and rotor pole tips during operation of the motor 10). The shape of each stator pole 18 is preferably symmetrical relative to radial line 26, with a radius 32 formed at the base of the rectangular body portion 22 proximate the inner periphery of the stator's annular body 34 to facilitate stator manufacture.

In accordance with another feature of the present invention, the nominal chordal dimension d' across the arcuate, radially-outermost surface 24 of each rotor pole 22 is preferably slightly greater than the nominal dimension across the arcuate, radially-outermost surface 20 of the tip portion 26 of each stator pole 18.

Figure 4:
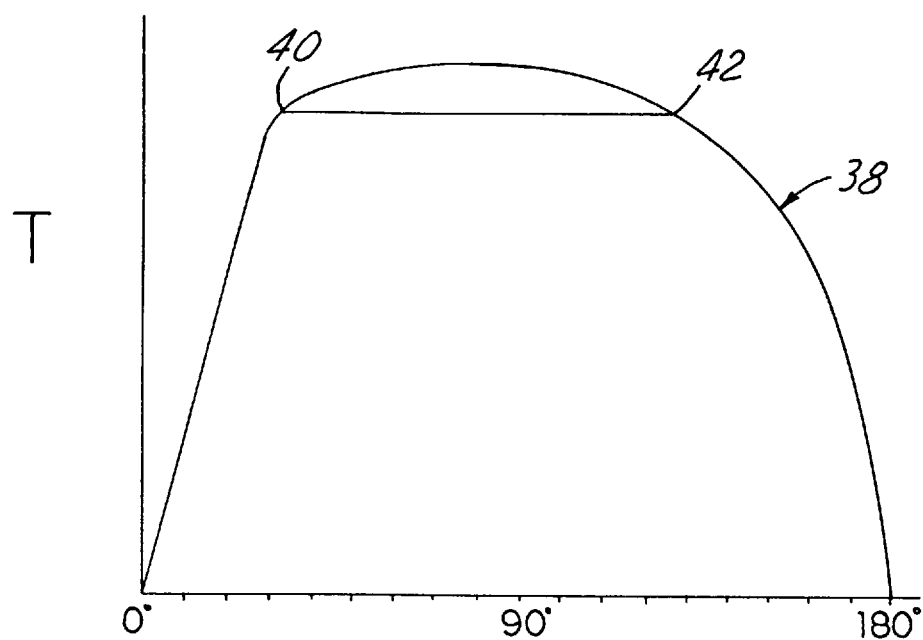
FIG. 4 is a representative plot of the torque profile for a given machine phase of the motor of FIG. 1, further annotated to show overlap with the torque profiles of other phases.

The single-phase torque profile generated by the magnetic interaction of the poles 18,22 of the stator 12 and rotor 14 is shown in FIG. 4, plotted as against electrical degrees of the given machine phase (with zero electrical degrees representing the unaligned position). When the stator poles 18 of a given machine phase are energized with a substantially constant energizing current, as through use of a conventional phase sequencer (not shown), the magnetic interaction between the energized stator poles 18 and the rotor poles 22 positioned within 180 electrical degrees thereof generates a torque as each rotor pole 22 is urged toward an aligned position with its respective energized stator pole 18.

Review of FIG. 4 confirms that the dual-section motor 10 of the present invention provides a flatter torque profile 38 without current mapping. Specifically, the maximum prescribed taper angle β of 40° and minimum prescribed body-to-tip "width" ratio reduces the relative flux density within the rectangular body portion 30 of each energized stator pole 18 as a given rotor pole 22 moves into alignment therewith. And, while a taper angle β of greater than 40° provides too "soft" a torque profile around the aligned position, a taper angle β of perhaps about 30° is considered to provide a sufficient reduction in flux density within the rectangular body portion 30 of the stator pole 18 while not otherwise penalizing the resulting torque profile around the alignment position. FIG. 4 also shows the region of overlap extending between points 40,42 of the illustrated torque profile 38 with the torque profiles of other phases.

While the preferred embodiment of the invention has been disclosed, it should be appreciated that the invention is susceptible of modification without departing from the spirit of the invention or the scope of the subjoined claims. Thus, while the invention was described and illustrated above in the context of a four-phase switched reluctance motor 10, it will be appreciated that the invention may be used in conjunction with any machine having at least two phases (i.e., a selected machine phase to be switched between modes, and a nonselected machine phase to be operated only during a multi-phase mode), as well as in conjunction with other well-known electric machines and/or structures.

We claim:

1. A switched reluctance motor comprising:
    an annular stator defining a plurality of radially-inwardly-extending poles, each stator pole defining a first shape in radial cross-section characterized by a generally rectangular body portion having substantially parallel sides, and a tapered tip portion with a radially-innermost arcuate surface, wherein the angle at which the sides of the tip portion taper is at least about 30° but is no greater than about 40° relative to the sides of the rectangular body portion, and wherein a nominal dimension from side to side of each pole's rectangular body portion is between about 1.3 times and about 1.45 times a nominal chordal dimension across the tip portion's radially-innermost arcuate surface; and
    a rotor, supported for rotation within said stator, defining a plurality of radially-outwardly-extending poles, each rotor pole defining a second shape in radial cross section.

2. The motor of claim 1, wherein the first shape of each stator pole is further characterized in that the sides of the rectangular body portion extend generally parallel to a radial line bisecting the stator pole.

3. The motor of claim 1, wherein the first shape of each stator pole is further characterized in that the radially-innermost surface of the tip portion is centered about a radial line bisecting the stator pole.

4. The motor of claim 2, wherein the first shape of each stator pole is symmetrical about the radial line bisecting the stator pole.

5. The motor of claim 1, wherein the second shape of each rotor pole has an arcuate radially-outermost surface having a nominal chordal dimension slightly greater than the nominal chordal dimension across the radially-innermost arcuate surface of the tip portion of each stator pole.

6. A switched reluctance motor comprising:
    an annular stator defining a plurality of radially-inwardly-extending poles, each stator pole defining a first shape in radial cross-section characterized by a generally rectangular body portion having substantially parallel sides, and a tapered tip portion with a radially-innermost arcuate surface, wherein the angle at which the sides of the tip portion taper is at least about 30° but is no greater than about 40° relative to the sides of the rectangular body portion, and wherein a nominal dimension from side to side of each pole's rectangular body portion is between about 1.3 times and about 1.45 times a nominal chordal dimension across the tip portion's radially-innermost arcuate surface;

a plurality of windings disposed about said stator poles wherein windings associated with diametrically opposing stator poles are electrically connected to define a respective motor phase; and a rotor, supported for rotation within said stator, defining a plurality of radially-outwardly-extending poles, each rotor pole defining a second shape in radial cross section.

7. The motor of claim 6 wherein the stator is of laminated construction.

8. The motor of claim 6, wherein the second shape of each rotor pole has an arcuate radially-outermost surface having a nominal chordal dimension slightly greater than the nominal chordal dimension across the radially-innermost arcuate surface of the tip portion of each stator pole.

9. A switched reluctance motor comprising:

an annular stator defining a plurality of radially-inwardly-extending poles extending along a longitudinal axis, each stator pole defining a first shape in radial cross-section characterized by a generally rectangular body portion having substantially parallel sides, and a tapered tip portion extending the longitudinal length of said stator with a radially-innermost arcuate surface, wherein the angle at which the sides of the tip portion taper is at least about 30° but is no greater than about 40° relative to the sides of the rectangular body portion, and wherein a nominal dimension from side to side of each pole's rectangular body portion is between about 1.3 times and about 1.45 times a nominal chordal dimension across the tip portion's radially-innermost arcuate surface;

a plurality of windings disposed about said stator poles wherein windings associated with diametrically opposing stator poles are electrically connected to define a respective motor phase; and, a rotor, supported for rotation within said stator, defining a plurality of radially-outwardly-extending poles, each rotor pole defining a second shape in radial cross section.

10. The motor of claim 9 wherein the stator is of laminated construction.

11. The motor of claim 9 wherein the second shape of each rotor pole has an arcuate radially-outermost surface having a nominal chordal dimension slightly greater than the nominal chordal dimension across the radially-innermost arcuate surface of the tip portion of each stator pole.

* * * * *